United States Patent [19]
Winkler et al.

[11] Patent Number: 4,842,455
[45] Date of Patent: Jun. 27, 1989

[54] PROTECTIVE COVERING FOR A MACHINE TOOL COMPRISING A LOADING DOOR

[75] Inventors: Hans-Henning Winkler, Brunnentalstrasse; Eugen Rütschle, Schönenbergstrasse, both, Fed. Rep. of Germany

[73] Assignee: Chiron-Werke GmbH & Co. KG, Tuttlingen, Fed. Rep. of Germany

[21] Appl. No.: 256,820

[22] Filed: Oct. 11, 1988

[30] Foreign Application Priority Data

Oct. 14, 1987 [DE] Fed. Rep. of Germany ....... 3734719

[51] Int. Cl.$^4$ ............................................. B23Q 11/08
[52] U.S. Cl. .............................. 409/134; 29/DIG. 56; 408/241 G; 74/608
[58] Field of Search ............................... 409/134, 219; 408/241 G, 67; 144/251 A; 74/608, 609, 614; 29/DIG. 50, DIG. 56, DIG. 94

[56] References Cited

U.S. PATENT DOCUMENTS

| | | | |
|---|---|---|---|
| 2,443,734 | 6/1948 | Kearney et al. | 409/134 |
| 2,542,419 | 2/1951 | Longstreet | 308/3.5 |
| 4,677,718 | 7/1987 | Babel | 409/134 X |
| 4,768,902 | 9/1988 | Rufschle et al. | 409/134 |

FOREIGN PATENT DOCUMENTS

| | | | |
|---|---|---|---|
| 3320738 | 6/1983 | Fed. Rep. of Germany | 409/134 |
| 8535836 | 12/1985 | Fed. Rep. of Germany | . |
| 679327 | 8/1979 | U.S.S.R. | . |

Primary Examiner—Z. R. Bilinsky
Attorney, Agent, or Firm—Rosenblum, Parish & Bacigalupi

[57] ABSTRACT

A protective covering for a machine tool where work pieces can be mounted on a worktable comprises a loading door which can be pivoted between two end positions and which in a first end position closes the protective covering while in the second end position it clears an opening in the protective covering providing access to the work piece. The bottom of the loading door describes during this movement an upwardly curved locus extending above and across the work piece. It is proposed for this arrangement that the loading door be provided on its inside with a device for diverting liquid flowing down its inside towards the lateral edges and that the said loading door does not project beyond the outer contour of the said protective covering during its movement.

4 Claims, 2 Drawing Sheets

PROTECTIVE COVERING FOR A MACHINE TOOL COMPRISING A LOADING DOOR

The present invention relates to a protective covering for a machine tool where work pieces can be mounted on a worktable, comprising a loading door which can be pivoted between two end positions and which in a first end position closes the protective covering while in the second end position it clears an opening in the protective covering providing access to the work piece, the bottom of the loading door describing during this movement an upwardly curved locus extending above and across the work piece.

In the case of a known protective covering of this type described by DE No. 33 20 738 C 2, when the operator opens the pivoting loading door, i.e. when he moves it from its first into its second end position, he initially pulls it towards himself during which movement the loading door is simultaneously raised, via a linkage mechanism. During the further motion, it is then moved into the machine tool and partly lowered behind the work piece. If the movement described before is performed on the work piece following a processing operation, liquid droplets originating from the lubricant or drilling oil used in the completed processing operation will appear on the inside and, in particular, at the bottom of the loading door.

Due to the high surface tension of the liquid drops, these tend to adhere in particular to the lower edge of the loading door so that when the latter is opened, a row of drops extending over the whole width of the door will appear.

Now, when the loading door is opened rapidly, the door, and the drops adhering to it, will be subjected to notable acceleration in the direction of the operator. The movement towards the operator is braked during the opening operation and reversed to a movement directed into the interior of the machine tool. At the moment of this reversal, i.e. when the loading door is braked, the liquid drops adhering to its lower edge fall off, and the kinetic energy encountered is sufficient to fling them towards and upon the operator. Consequently, the operator and/or his work dress get heavily soiled by such a rapid opening operation. If one considers that numerous successive processing operations are performed by such a machine tool during one working day, these conditions have considerable detrimental effects for the operator.

Another disadvantage of the protective covering of the type described above is seen in the fact that the loading door projects temporarily from the outer contour of the protective covering during the opening operation, and correspondingly, also during the closing operation. If during such a pivotal operation the operator, having gripped the loading door by one hand, lets his other hand by some carelessness rest on the protective covering, it may be possible that his hand gets jammed between the protective covering and the loading door during the opening or closing operation.

Now, it is the object of the present invention to improve a protective covering of the type described above in such a manner that clean and secure handling of the loading door is rendered possible.

This object is achieved according to the invention by the fact that the loading door is provided on its inside with means for diverting liquid flowing down its inside towards the lateral edges and that the loading door does not project beyond the outer contour of the protective covering during its movement. By providing these diverting means the formation of liquid drops over the whole length of the lower edge is no longer possible. Given the fact that the liquid gathering over the whole width of the inside of the loading door is diverted towards the corners, the latter carry off a relatively important liquid flow so that almost all liquid is carried off, practically without any residues. At the most, one drop each may be formed at the two outermost corners, at the discharge of the arrangement. Considering, however, that such doors usually have a width considerably greater than the width of a human body, such drops splashing off from the corners would no longer impair the operator. Given the fact that the loading door does not project beyond the outer contour of the protective covering during this movement, the lower edges of the loading door remain inside the protective covering during the pivotal movement so that the corners are never exposed. This practically excludes any risk of residual liquid quantities being splashed off in this area. In addition, the fact that the loading door does not project beyond the outer contour of the protective covering during this movement ensures at the same time that no parts of the operator's body or of his clothing can get jammed between the moving loading door and the stationary protective covering.

Accordingly, the features proposed by claim 1 solve the object underlying the invention fully and perfectly.

According to a particularly advantageous embodiment of the invention, the device comprises a roof-shaped channel whose outer ends end in a discharge at the corners of the loading door. This arrangement provides the advantage that the liquid dripping off the inside of the door can be collected and carried off by extremely simple constructional means and in an undisturbed manner.

To this end, the roof-shaped channel is arranged conventionally in the area of the lower edge. This provides the advantage that the liquid flowing off along the upper portion of the inner face can already gather to form a relatively dense liquid film which is then carried off rapidly and completely via the channel.

According to another preferred embodiment of the invention, the corner end portions are directed away from the inside. This provides the advantage that the liquid carried off is diverted in a direction towards the inner space of the protective covering so that the drops will get detached from the inside particularly easily.

The invention will now be described in more detail by way of a selected embodiment and with reference to the drawing in which.

Figure 1:
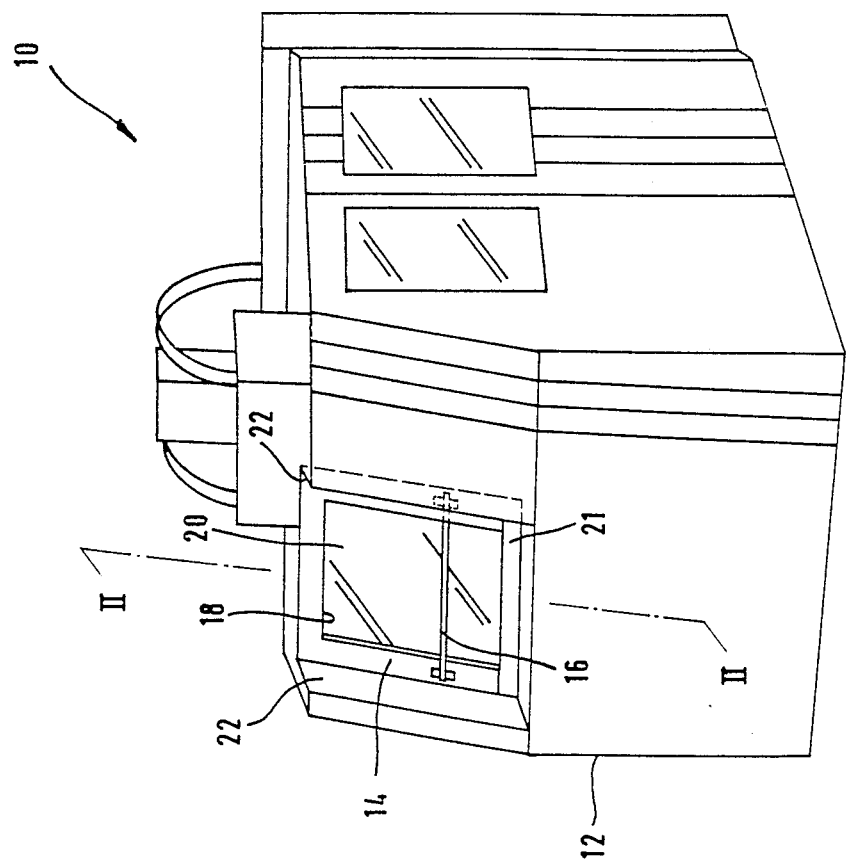
FIG. 1 shows a diagrammatic and perspective view of a protective covering according to the invention.
Figure 2:
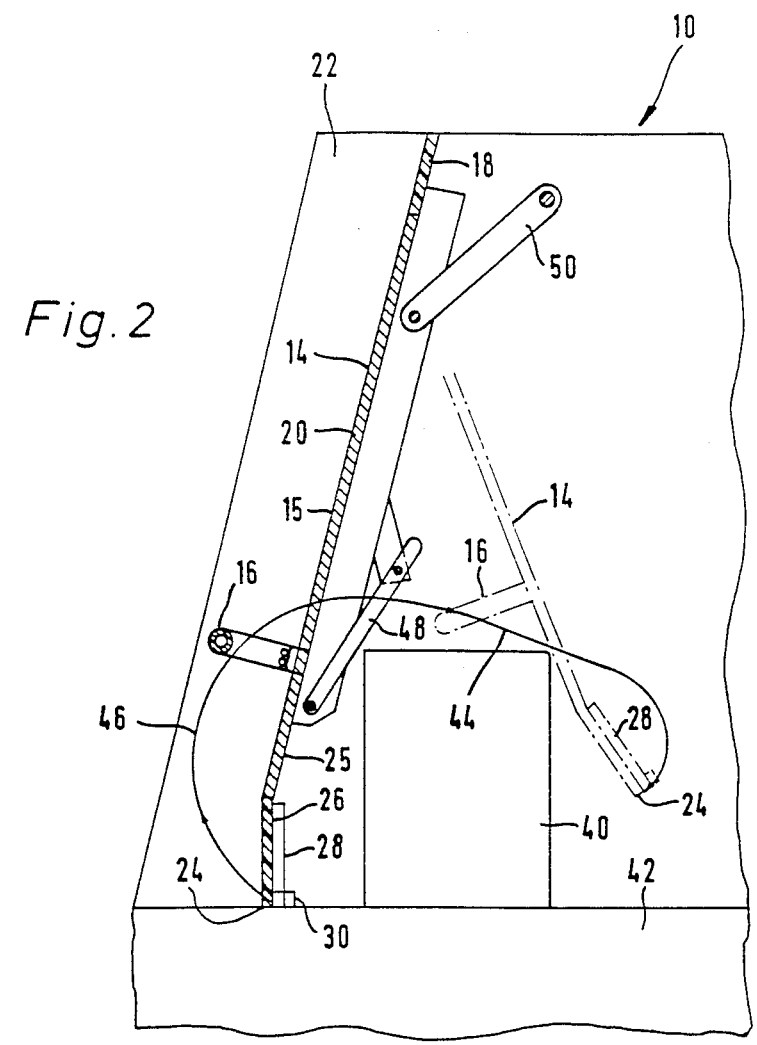
FIG. 2 shows a partial sectional view taken along line II—II in FIG. 2.
Figure 3:
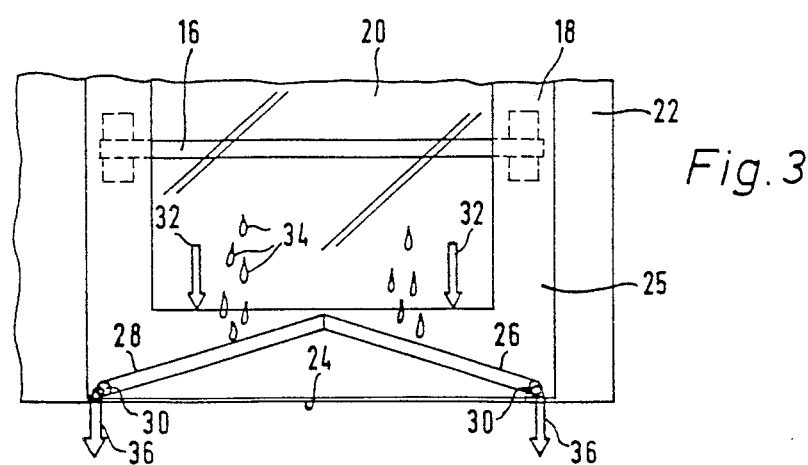
FIG. 3 shows a partial view of the protective covering according to the invention, viewed from the inside of a machine tool.

The machine tool 10 shown in FIGS. 1 to 3 is provided with a protective covering 12.

The protective covering 12 comprises a loading door 14 with a rod 16 extending across its outside 15 and serving as a handle for the loading door 14.

The loading door 14 comprises a frame 18 with a glass pane 20 mounted therein through which the inner space of the machine tool 10 enclosed by the protective covering 12 can be observed from the outside.

The loading door 14 is received in a niche 21 in the protective covering 12 so that parts 22 of the protective covering 12 project on both sides of the vertical edge of the frame 18.

As can be seen best in FIG. 2, the loading door 14 is connected via links 48, 50 with a pivoting mechanism not shown in detail in the drawing; this mechanism ensures that when the loading door 14 is moved from a first end position indicated by full lines in FIG. 2, in which it closes the protective covering 12, into its second end position indicated by dash-dotted lines, the lower edge 24 describes, for example, a curved locus 44.

This enables the loading door 14 to be moved, during the opening and closing operation, above and across a workpiece 40 mounted on a work table 42 of the machine tool 10, without touching the latter or changing its position.

As will be seen in FIGS. 2 and 3, a liquid-collecting device 26 in the form of a roof-shaped channel 28 is provided on the inside 25 of the loading door 14, in the area of the lower edges 24 and below the pane 20. The "ridge" of the channel 28 is in this case arranged at the center, shortly below the lower edge of the pane 20.

In the area of the lower corners of the loading door 14, the channel 28 ends in discharges 20 which—as can be seen best in FIG. 2—are directed towards the inner space of the machine tool 10.

Any lubricant or drilling oil splashed upon the inside 25 of the loading door 14 during a processing operation runs down, by gravity, in the form of droplets 34 towards the channel 28 arranged at the bottom, as indicated by arrows 32 (FIG. 3). The droplets are collected in the channel 28 and carried off via the lateral discharges 30—as indicated by arrows 36—in a direction away from the inside 25 of the loading door. The channel itself may have a semi-circular, V-shaped or rectangular cross-section and may be fixed to the loading door 14 in different manners, depending on the design of the door. If the loading door 14 is made, for example, from metal the channel may be riveted or welded directly to its inside. If the loading door 14 consists of a plastic material, the channel may be integrally formed with the door, on its inside, directly during the production process.

As appears in particular from FIG. 2, when an operator pulls the rod 16, the bottom 24 of the loading door 14 performs a movement away from the interior of the machine tool and in upward direction, along the curved locus 44, which movement is then reversed after the transition zone 46 has been passed. Due to the fact that the loading door 14 is received in a niche 21 (see FIG. 1) in the protective covering 12, i.e. that portions 22 of the covering project on both sides thereof, the loading door 14 does never project beyond the outer contour of the protective covering 12 on the side facing the operator so that there is no risk that any parts of the operator's body or clothing may get jammed, by inattentiveness, between the loading door and the remaining parts of the protective covering 12. The parts 22 of the covering projecting in the horizontal direction are of course sized in such a manner that the transition 46 of the curved locus extends in any case inside their vertical longitudinal edges.

The outer lower corners of the loading door 14, which are provided with the discharges 30, move along a path in the direct neighborhood of the parts 22 of the covering, during movement of the loading door 14, so that no liquid adhering to the corner areas of the door will splash off, not even when the movement towards the operator is braked in the transition zone 46, because any liquid that may be entrained between the parts 22 of the covering and the loading door will stick in place due to its surface tension.

We claim:

1. Protective covering for a machine tool, wherein work pieces can be mounted on a worktable of said machine tool comprising a loading door which can be pivotally moved between two end positions, said loading door closes in a first end position said protective covering while in a second end position it clears an opening in said protective covering, thereby providing access to said work piece, a bottom of said loading door describes during this movement between said first and said second end positions an upwardly curved locus extending above and across said work piece, wherein said loading door is provided on its inside with a device for diverting liquid flowing down at said inside of said loading door toward lateral corners of said loading door and wherein said loading door does not project beyond the outer contour of said protective covering during its movement between said first and said second end positions.

2. Protective covering according to claim 1, wherein said device for diverting liquid comprises a roof-shaped channel whose terminal ends in discharge means at said lateral corners of said loading door.

3. Protective covering according to claim 2, wherein said roof-shaped channel is disposed in an area adjacent to a lower edge of said loading door.

4. Protective covering according to claim 2, wherein said discharge means are directed away from said inside of said loading door.

* * * * *